US010417077B2

(12) United States Patent
Hobbs et al.

(10) Patent No.: US 10,417,077 B2
(45) Date of Patent: Sep. 17, 2019

(54) SOFTWARE HANDLING OF HARDWARE ERRORS

(71) Applicant: 2236008 Ontario Inc., Waterloo (CA)

(72) Inventors: Christopher William Lewis Hobbs, Ottawa (CA); Kerry Wayne Johnson, Ottawa (CA)

(73) Assignee: 2236008 Ontario Inc., Waterloo, Ontario (CA)

(*) Notice: Subject to any disclaimer, the term of this patent is extended or adjusted under 35 U.S.C. 154(b) by 26 days.

(21) Appl. No.: 15/280,717

(22) Filed: Sep. 29, 2016

(65) Prior Publication Data

US 2018/0089010 A1    Mar. 29, 2018

(51) Int. Cl.
*G06F 11/00* (2006.01)
*G06F 11/07* (2006.01)

(52) U.S. Cl.
CPC ........ *G06F 11/079* (2013.01); *G06F 11/0721* (2013.01)

(58) Field of Classification Search
CPC ........................... G06F 11/079; G06F 11/0721
USPC .......................................................... 714/37
See application file for complete search history.

(56) References Cited

U.S. PATENT DOCUMENTS

| | | | | |
|---|---|---|---|---|
| 9,904,595 | B1* | 2/2018 | Jalan | G06F 3/0619 |
| 10,040,437 | B2* | 8/2018 | Albright | B60T 7/20 |
| 10,124,750 | B2* | 11/2018 | Markham | H04W 4/40 |
| 10,191,833 | B2* | 1/2019 | Chen | G06F 11/3632 |
| 2007/0168096 | A1 | 7/2007 | Boutin | |
| 2011/0204857 | A1* | 8/2011 | Casteel | G05B 9/03 322/59 |
| 2012/0278660 | A1* | 11/2012 | Mangold | G06F 11/3688 714/38.1 |
| 2013/0282249 | A1* | 10/2013 | Heise | B60T 7/042 701/70 |
| 2016/0264115 | A1* | 9/2016 | Schwindt | B60T 8/885 |
| 2016/0347462 | A1* | 12/2016 | Clark | B64C 39/024 |
| 2018/0089010 | A1* | 3/2018 | Hobbs | G06F 11/0721 |
| 2018/0362168 | A1* | 12/2018 | Clark | B64D 17/62 |

OTHER PUBLICATIONS

Wikipedia "CAN bus" page from Sep. 7, 2016, retrieved using the Way Back Machine, from https://web.archive.org/web/20160907231827/https://en.wikipedia.org/wiki/CAN_bus (Year: 2016).*
Wikipedia "Virtual Synchrony" page from Sep. 7, 2016, retrieved using the Way Back Machine, fromhttps://web.archive.org/web/20160826060520/https://en.wikipedia.org/wiki/Virtual_synchrony (Year: 2016).*

(Continued)

*Primary Examiner* — Yair Leibovich
(74) *Attorney, Agent, or Firm* — Rowand LLP

(57) ABSTRACT

A system and method that detects hardware and software errors in an embedded system that includes detecting or measuring an operating state; causing one or more computation engines to operates in group synchrony; causing one or more active monitors that monitor the computation engines to an automotive integrity level to operate in group synchrony; synchronizing the communication between and from the plurality of computation engines and the plurality of active monitors, respectively; and arbitrating the output generated by the computation engines and the active monitors.

20 Claims, 6 Drawing Sheets

(56) References Cited

OTHER PUBLICATIONS

International Search Report dated Dec. 18, 2017 corresponding to International Application No. PCT/CA2017/051108 filed on Sep. 21, 2017, 3 pages.
Written Opinion dated Dec. 18, 2017 corresponding to International Application No. PCT/CA2017/051108 filed on Sep. 21, 2017, 4 pages.
G. Latif-Shabgahi et al., "A Taxonomy for Software Voting Algorithms Used in Safety-Critical Systems", IEEE: Transactions on Reliability, vol. 53, No. 3, Sep. 2004, 10 pages.
John H. Wesley et al., "SIFT: Design and Analysis of a Fault-Tolerant Computer for Aircraft Control", Proceeding of the IEEE, vol. 66, No. 10, Oct. 1978, pp. 1240-1255.
Lamport, L., "Time, Clocks, and the Ordering of Events in a Distributed System," Communications of the ACM, Jul. 1978, vol. 21, No. 7, pp. 558-565.
Birman, K., "A History of the Virtual Synchrony Replication Model," Replication, LNCS 5959, 2010, pp. 91-120.
Ferrari, F. et al., "Virtual Synchrony Guarantees for Cyber-physical Systems," IEEE Xplore Digital Library, Nov. 27, 2013, 11 pages.
Johnson, Kerry et al., "Replication techniques for increasing reliability in safety-critical automotive systems," ATZelektronik worldwide, Issue Apr. 2016, 8 pages.

\* cited by examiner

SOFTWARE HANDLING OF HARDWARE ERRORS

BACKGROUND OF THE DISCLOSURE

1. Technical Field

This disclosure relates to embedded software systems and specifically to distributed architectures that render tunable immunity to software and hardware faults.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like referenced numerals designate corresponding parts throughout the different views.

DETAILED DESCRIPTION

Figure 1:
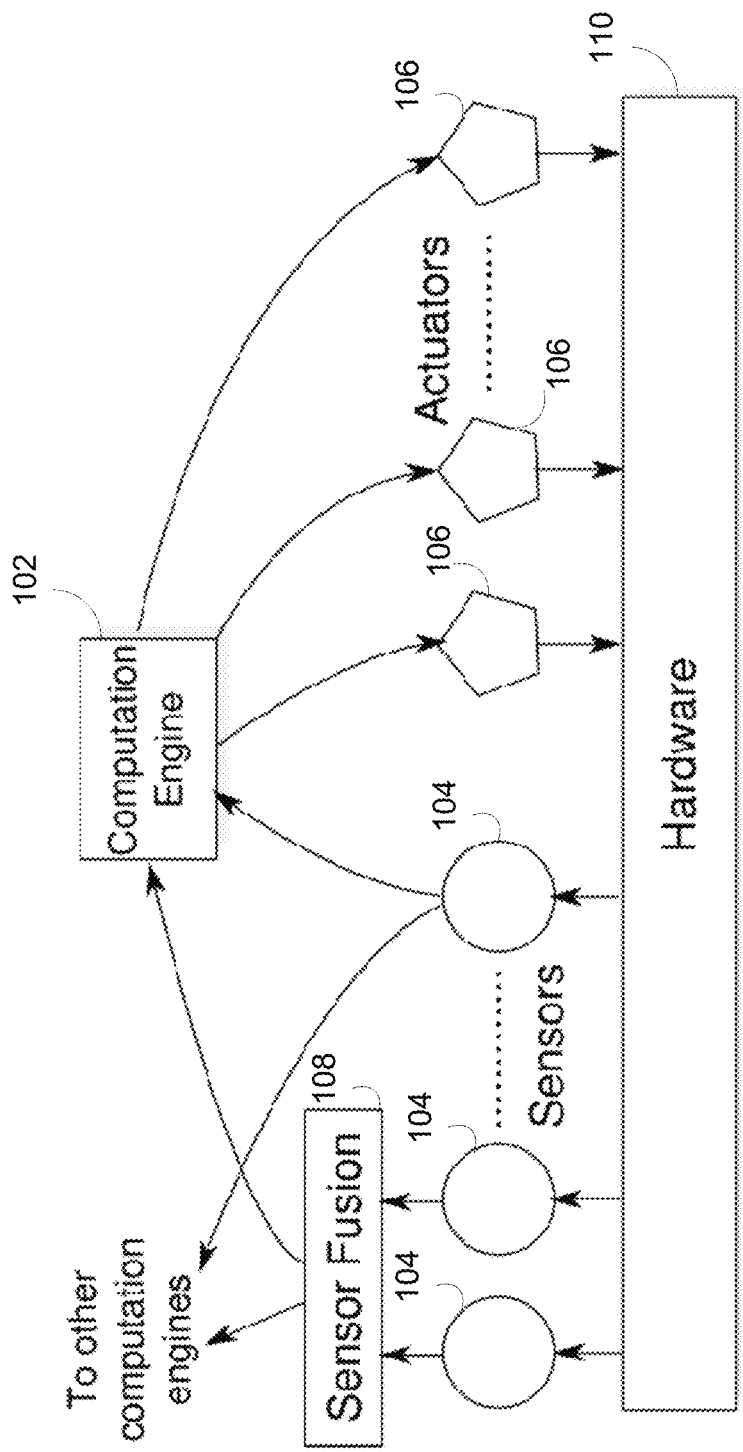
FIG. 1 is a logical view of an embedded system.

Hardware such as processors and memory are becoming significantly less reliable. As hardware gets smaller, it is failing more frequently. Its reduced size and increasing complexity makes it susceptible to the secondary effects of cosmic rays, internal cross-talk, and electromagnetic interference that can cause transient or soft errors. The random and transient nature of these soft errors make the errors difficult to detect and trace to their source. The errors can be masked and may propagate through other operations before even being detected.

To make matters worse, the underlying hardware that executes many of the application programs includes caches and coprocessors, for example, and these are hidden from the operating systems and application programs. So, when errors occur, such as when a bit flips randomly within memory, the error goes undetected until the application program completes an operation.

Improved error detection at the hardware level has been ineffective in addressing this problem. The hardware is often expensive and not fit-for-purpose. In other words, the hardware's processing is not necessarily appropriate and compliant with the necessary standard for its intended use.

This disclosure provides a loosely-coupled locked-step architecture for embedded systems. Embedded systems are those systems that are made an integral part of another system or process, such as a vehicle or medical device, for example. The architecture makes use of replication and diversification through virtual synchrony to provide resilience against random or non-reproducible hardware errors that can give rise to different failures that can occur much later in a processing thread than when the original fault first occurs. The architecture is effective in detecting and mediating software errors too, such as heisenbugs, for example that are becoming more common as more multi-thread code runs on multi-core processors. Unlike software bugs that have properties that do not change when debugging code is inserted into source or object code, heisenbugs are a type of will-of-the-wisp error that arbitrarily appear and disappear in a manner that makes them elusive. Heisenbugs can be caused by subtle timing problems, for example, such as when a thread running on one processor core releases a buffer that is subsequently written to by another thread. In some instances, heisenbugs can give rise to different arbitrary faults at earlier and later times of the processing operation. The fault's unpredictability and randomness causes some to refer to heisenbugs as non-reproducible bugs.

When a software instance fails, for example, because of a random error, the disclosed architecture ensures that the failing system continues to operate. In some instances, the failing system may operate in a degraded state. When detected, the architecture's middleware may automatically isolate the failure and reboot or restart the failing hardware or reboot or restart all or a portion of the system's code such as that portion that is failing. This resilience provides a level of "fail-operational" behavior.

When a severe failure occurs or the system completely fails, the system may move to a design-safe-state (DSS). A DSS is a device or process, that in the event of a specific type of event, responds or results in a certain way such as in a way that reduces or avoids harm to the device or user. In other words, it is a state that the system enters when the system doesn't know what else to do. A specific type of event may include: an event which the system was not programmed to handle, an event it would fail to respond to in a timely manner, an event that it would respond to correctly, but if it did, it would corrupt its own internal state in such a way future events might not be handled correctly, for example. The DSS is programmed during the system's design or application and may vary with environments and events. It may occur, for example, when a drug dispensing system fails—in that case, it may stop the drug flow, in a vehicle application it may apply the brakes or relinquish autonomous control (i.e., hand control to human driver of a self-driving vehicle).

The disclosed architecture separates two aspects of software design: (1) the technical and algorithmic skill required to write or implement software that fulfills a particular purpose; and (2) the statistical skill required to determine the level and timing of replication and diversity. The disclosed architecture allows the level of resiliency required for a particular subsystem to be programmed during the software's development and to be tuned dynamically before or during its operation in its intended operating environment or state. In a vehicle application the operating environment or state may comprise a cruising state, an urban driving state, a rural driving state, a parking state, a high or a low traffic congestion state, or any other vehicle operating state or any traffic condition state or any combination of any of the above environments or states. And, the resiliency level establishes the number of replicas and their activation times or periods, the number of responses required before a response is accepted and acted upon, and the number of diverse implementations required.

The disclosed architecture also supports diverse computation engines and active monitors or safety bags which enables design to be partitioned in-line with the automotive safety integrity levels (ASILs) including the decomposition levels called out in the ISO 26262 standard, for example.

The ISO 26262 standard is the specialization of functional safety standard of electrical/electronic/programmable electronic safety related systems of the IEC 61508 standard for production cars. References to the ISO 26262 and other standards that follow include the current and future versions of those standards, any related standards to the current and future versions, and any superseding standards.

The underlying replication and diversification of the disclosed architecture can verify new and legacy software efficiently at the start or during software execution to the functional safety levels of a standard such as the automotive safety integrity levels ASIL A, B, C, or D described in the ISO 26262 standard without building compliant software from the start. The disclosed architecture and middleware may reduce the evidence a software program requires for certification by certification authorities and ensures operational integrity levels, that in some instance, can be associated with a measure or a level of established safety.

FIG. 1 is a logical view of a system that is made integral to another system (e.g., it is embedded) such as a vehicle (not shown). The system includes a computation engine 102 interfaced to and in communication with a plurality of sensors 104 and actuators 106. The sensors 104 can include automotive sensors such as one or more or a combination that detect or measure engine functions, vehicle operating functions, entertainment and climate functions, and chassis functions, for example, that may convert nonelectrical energy into electrical energy. The sensors 104 may measure distance driven, vehicle speed, safety equipment in-use, acceleration, braking (or deceleration), traffic conditions (high congestion vs. low congestion), road conditions, throttle position, engine coolant temperature, manifold absolute pressure, oxygen content, entertainment and climate status, airbag status, anti-lock braking, relative distance to other objects, wheel spin, closing speed on a vehicle's front, rear, and sides, tire pressure, driver identification, camera images, surveying technology such as Lidar, keyboards, etc. The computation engine 102 processes the sensors' output or a combined output of multiple sensors (shown as sensor fusion 108) through a processor and an application program that comprises the computation engine 102. In response to a control signal transmitted from the computation engine 102 or through another computation engine, the actuators 106 shown in FIG. 1 activate, control, or put into motion another mechanism or system (shown as hardware 110) such as a mechanical device. The mechanism or system may release a vehicle's brakes, for example, or cause a self-driving vehicle to turn a corner or approach a destination, etc.

When a higher level of availability or reliability is required, the computation engine shown in FIG. 1 may be replicated and diversified. The term availability generally refers to how often an embedded component responds; and the term reliability generally refers to how often that response is correct. In other words, the computation engine may be replicated and the outputs compared to ensure consistency, accuracy, reliability, accessibility, and immunity to faults. An active replication may be implemented through software provided the replicas are synchronized. Synchronization may require protocols to ensure that the replicas remain in step. A benefit of the disclosed loosely-coupled locked-step architecture is its middleware 204 that virtually sits between the computation engine instances or replicas 202 and the sensors 104 and actuators 110 and synchronizes them without changing these programs as shown in FIG. 2.

The underlying form of replication or diversification implemented in the loosely-coupled locked-step architecture is that, if each computation engine begins in the same state and each receives the same data and messages in the same order, then all of the computation engines will arrive (eventually) at the same state and give the appearance of a synchronous execution (e.g., group synchrony). This means, any number of computation engines 202 will process messages and data in group memberships through an ordered and concurrent message delivery in response to a reliable message delivery received through the middleware 204 across a bus. In an embedded environment, such as a vehicle, for example, data volume is relatively small and the operations performed on that data are complex when compared to the synchronization that can occur on a server farm. In vehicles, messages are often transmitted across a local serial bus, Ethernet, or controller area network (CAN) rather than an openly accessible distributed network like the Internet that a server farm uses. And, the calculations performed by computation engines in the vehicle may be complex requiring it to determine whether a target in an image captured by a front-facing camera, for example, is a person or a shadow, or the calculations may decide when to apply the vehicle's brakes and at what pressure, versus the less complex operation of merely providing high throughput via a server farm.

Figure 2:
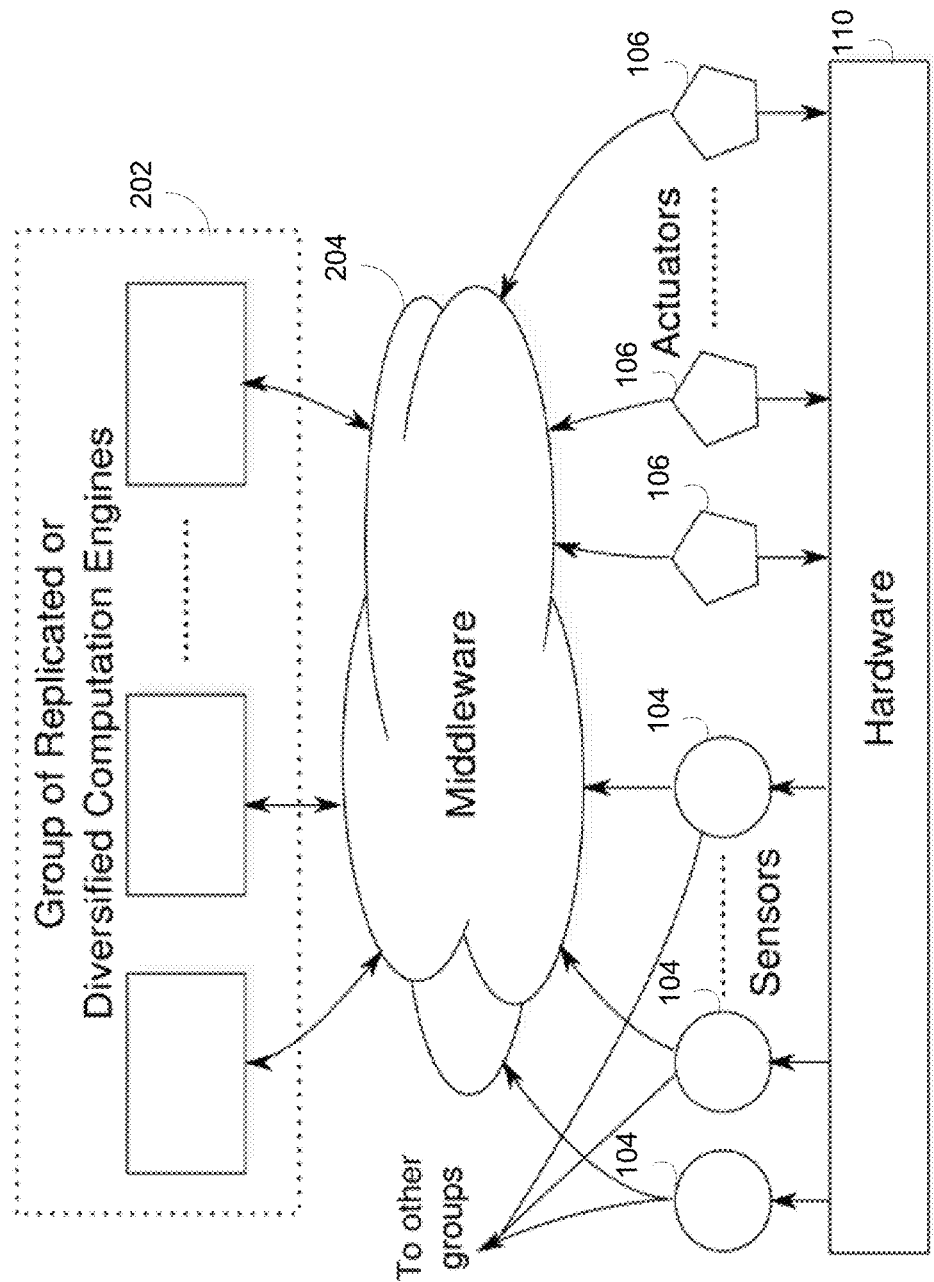
FIG. 2 is a virtual synchrony extension of an embedded system.

In FIG. 2 the communication framework of the loosely-coupled locked-step architecture joins group or replicated computation engines 202 into a group membership. A particular computation engine may join several groups and a group may contain any number of computation engines. The members of a group may be physically distinct and executed on different processors, and to avoid single points of failure, the architecture operates without access to a common or global clock. Timing occurs through an ordering of events such as through Lamport techniques and relationships that ensure every group member receives every event in the same order.

In FIG. 2 each group member starts in the same digital logic state and processes the same events in the same order. All members reach the same synchronization points, albeit it can be at different times. This operating behavior is not a hard synchronization of the computation engines as would result from a hardware locked-step, rather it is a loosely-coupled locked-step where each step is the completion of the processing of a particular event by the slowest computational engine member of the group.

Other, looser, event orderings are practiced when different members of a group are allowed to receive messages in different orders. When a strict sequence is not necessary, an additional level of entropy is introduced into the embedded system, increasing resilience against heisenbugs that might be associated with the precise sequencing of messages.

As in FIG. 1, the sensors 104 shown in FIG. 2 provide data to the group of replicated and diversified computation engines 202 that present the appearance of and respond like a single computational engine to the devices it communicates with. The data it processes, however, are intercepted by the middleware 204 and presented to each engine instance according to a defined order. In one implementation, each computational engine is unaware of its other group members and performs its own (complex) calculations. When the actuators 106 query the group of the replicated or diversified computation engines 202, depending on the dependability level required, the actuators 106 can request a response based on one, two, or more, or all the instances of the replicated and diversified computation engines group members 202. Unless all responses are requested, the middleware 204 discards the unwanted responses, thereby improving the architecture's performance.

The number of responses requested by an actuator 106 that a response is based on allows the actuator 106 to balance the importance of availability relative to reliability. The measure of importance between how many computation engines instances respond versus how often a computation engine instance's response is correct changes dynamically in some architectures depending on the current systems operating environment and event. For example, when a vehicle is travelling at high rate of speed on a highway, availability is likely to be more of a priority than reliability. Likewise, when the vehicle is travelling slowly in an urban environment, reliability might take precedence over availability. The actuator makes the choice of how to respond given the responses it received.

The system illustrated in FIG. 2 illustrates a single layer of sensors 104 and actuators 106 requesting services (e.g., acting as clients) and computation engines 202 that communicate with the sensors 104 and transmit commands to the actuators 106 (e.g., acting as servers). In alternative implementations the computation engines 202 also act as clients to other groups or instances of computation engines. Because of the isolation provided by the distributed nature of the loosely-coupled locked-step architecture, this alternative implementation does not alter the implementation of the computation engines.

Figure 3:
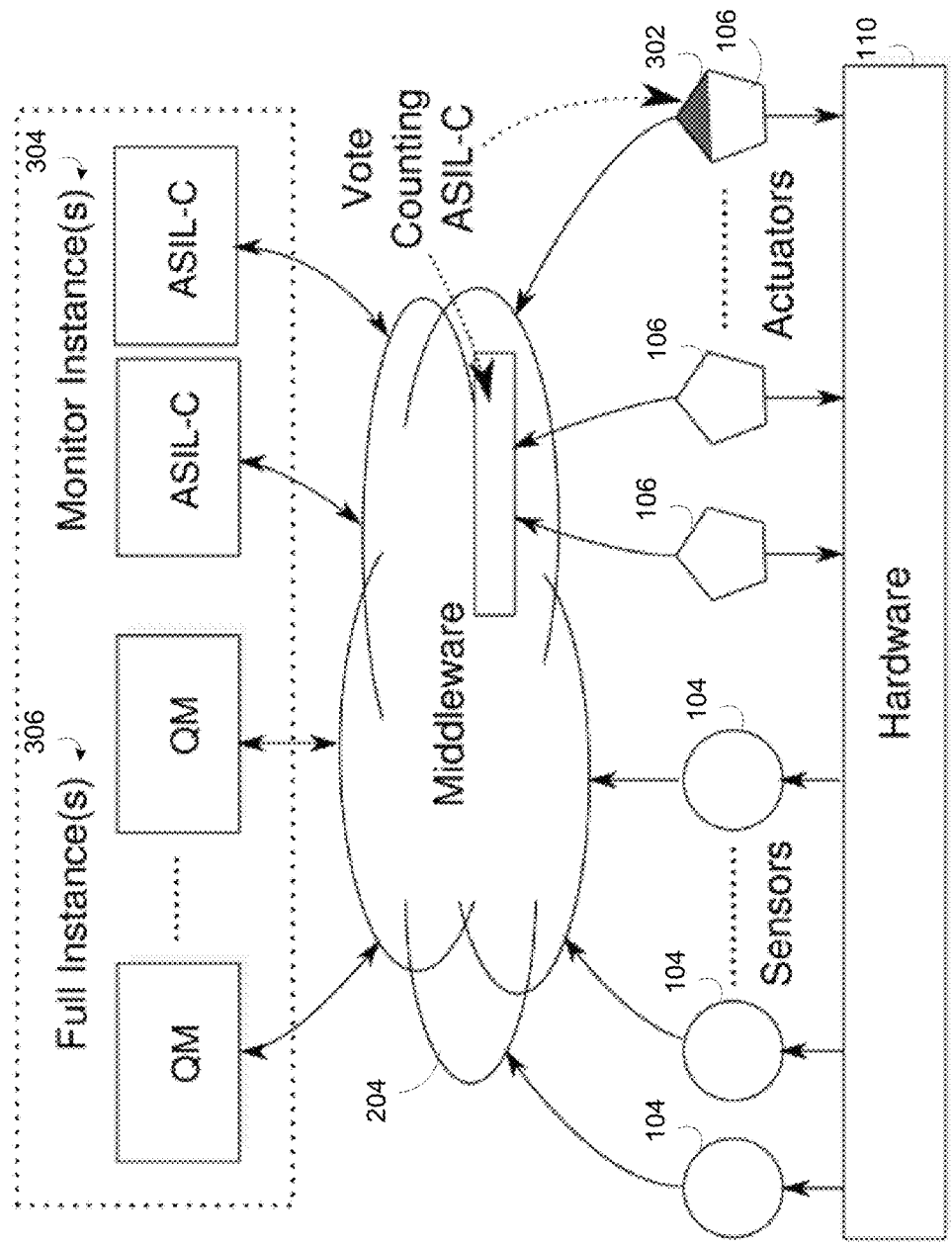
FIG. 3 is a virtual synchrony extension of an embedded system with active monitors and arbitrators.

In some systems compliant with the ISO 26262 standard or the IEC 61508 standard, safety bags or active monitors 304 join the group of replicated or diversified computation engines 306 and may operate separately in group synchrony as shown in FIG. 3. In this implementation, the algorithm executed by the computation engines 306 is abstracted to define the optimal response of the computational engines 306 under the system's operating condition which is then processed by one or more active monitor instances to assure that the computation engines operate at an expected quality level. A difference between the computational engine instances 306 and the active monitor instances 304 is that the active monitor instances 304 have a lower level of complexity. For example, in a vehicle cruise control application, the computational engines may accept speed and distance data from internal and road-side sensors, taking into account the gradient and elevation of the road and the densities of surrounding traffic to determine an optimal point to disengage the vehicle cruise control application. Some implementations of the active monitor instances 304, on the other hand, may receive some or all of the same information but base calculations only on predetermined movement limits and internal sensor data. The active monitors execute a less complex algorithm to determine an optimal range to disengage the vehicle cruise control application.

Figure 5:
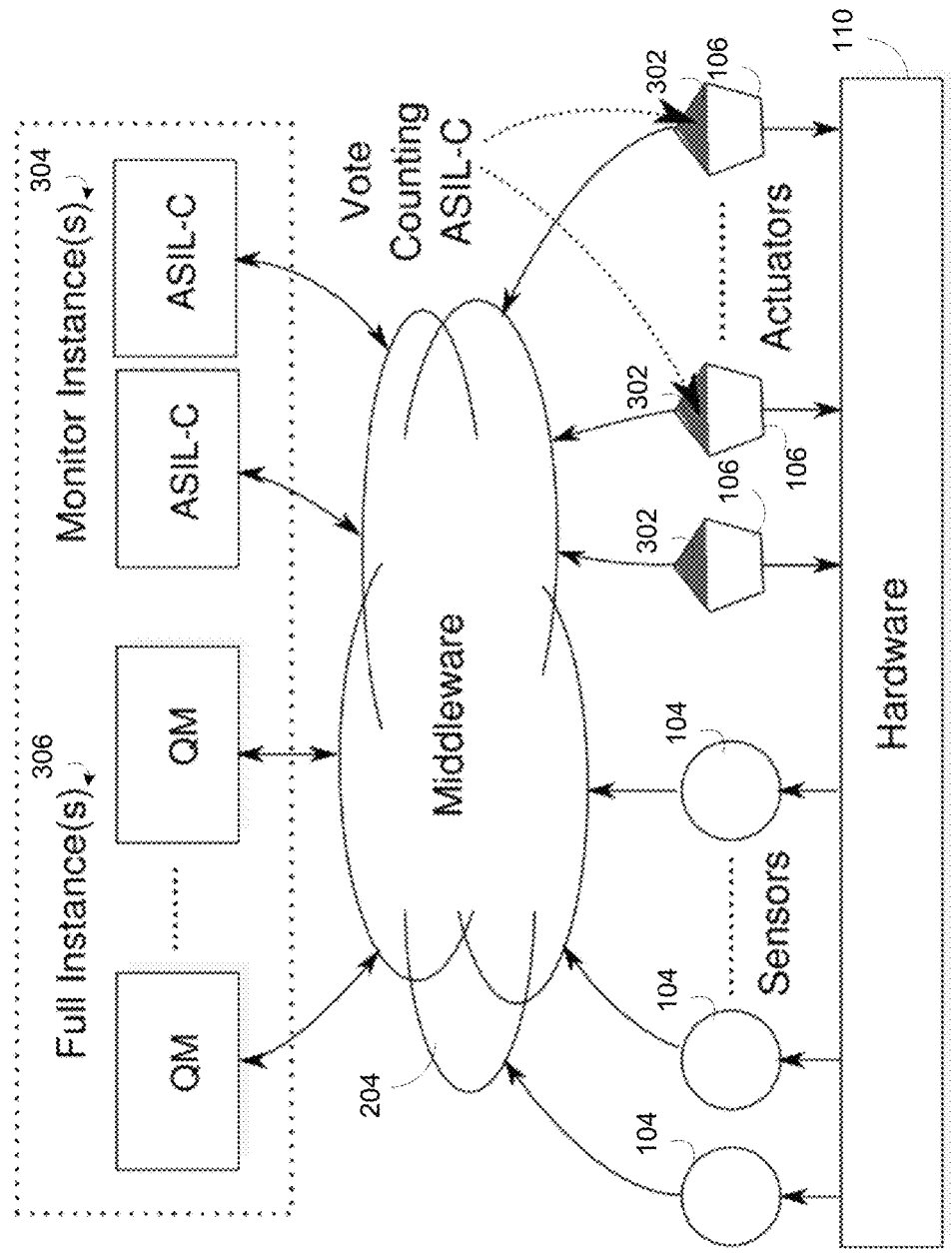
FIG. 5 is a second virtual synchrony extension of an embedded system with active monitors and arbitrators.

Although less complex, and in some instances generating a sub-optimal output when compared to the output of the computational engines, the active monitors 304 assure the overall embedded system is operating at an integrity level (or a vehicle integrity level). The assurance comes from the active monitors 304 identifying composite limits or ranges that are compared to the composite output of the computation engine instances 306 by the middleware 204. The middleware 204 appropriately flags any differences or discrepancies before both outputs and associated flags are transmitted directly to one or more of the actuators 106 or an intermediate arbiter (not shown) that transmits control signals to one or more of the actuators 106. In FIGS. 3 and 5, the shaded portions 302 of the actuators 106 represent the arbitration logic or arbiter devices used by the actuators 106 to determine how the actuators 106 respond. In one version, the arbiters command and one or more of the actuators 106 apply a DSS when a severe conflict or severe reliability issue arises. In another version, the arbiter modifies or alters the output of the computational engines shown as QM instances 306 so that it is compliant with the monitoring standard before it is transmitted to the actuators.

FIG. 3 shows how the architecture shown in FIG. 2 can be reconfigured to support safety bags or active monitors 304 operating to a virtual synchrony model. The computation engine instances or replicas designated quality management (QM) 306 indicate that the computation engines instances 306 were developed under a quality management system as defined in the ISO 26262 standard, but have not been certified to an automotive safety integrity levels such as ASIL A, B, C, or D of the ISO 26262 standard. The active monitor instances 304 designated automotive safety integrity level-C (ASIL-C) in FIG. 3, establish that the replicated monitor instances are monitoring and tracking the outputs of the QM instances to the automotive safety integrity level C. Under the ISO 26262 standard, QM imposes the fewest development requirements, and ASIL-D the most development requirements, and ASIL-C is an intermediate development requirement that falls between ASIL-A and ASIL-D.

In FIGS. 3 and 5, diverse instances of the computation engines 306 can be members of the same group. Because of their complexity, these computation engines instances 306 may not be or cannot be certified to an ASIL standard. The decomposition provided by the safety bags or active monitors 304 shown in FIGS. 3 and 5 allow the entire embedded system to be certified. In other implementations, the middleware 204 itself is certified. As shown, the purpose(s) that the embedded systems are to fulfill is executed by the QM devices 306 or processes that are monitored by the ASIL-C devices or processes.

The comparison of the various responses from the QM group members 306 or between the membership and the active monitors 304 or between the active monitor membership can be arbitrated at the actuator itself 106, by the middleware 204, or by a distributed device remote from, but in communication with, the middleware 204. Because some output of the QM instances 306 may not be verified, and thus cannot be trusted and because some instances of active monitors 304 may be susceptible to another device or process masquerading as a valid active monitor (e.g., spoofing), some active monitors and QM instances authenticate themselves with the actuators 106, middleware 204, or remote distributed arbiter devices before fulfilling their intended purpose. In these implementations, when an active monitor or QM is not authenticated, their output is disregarded.

Figure 4:
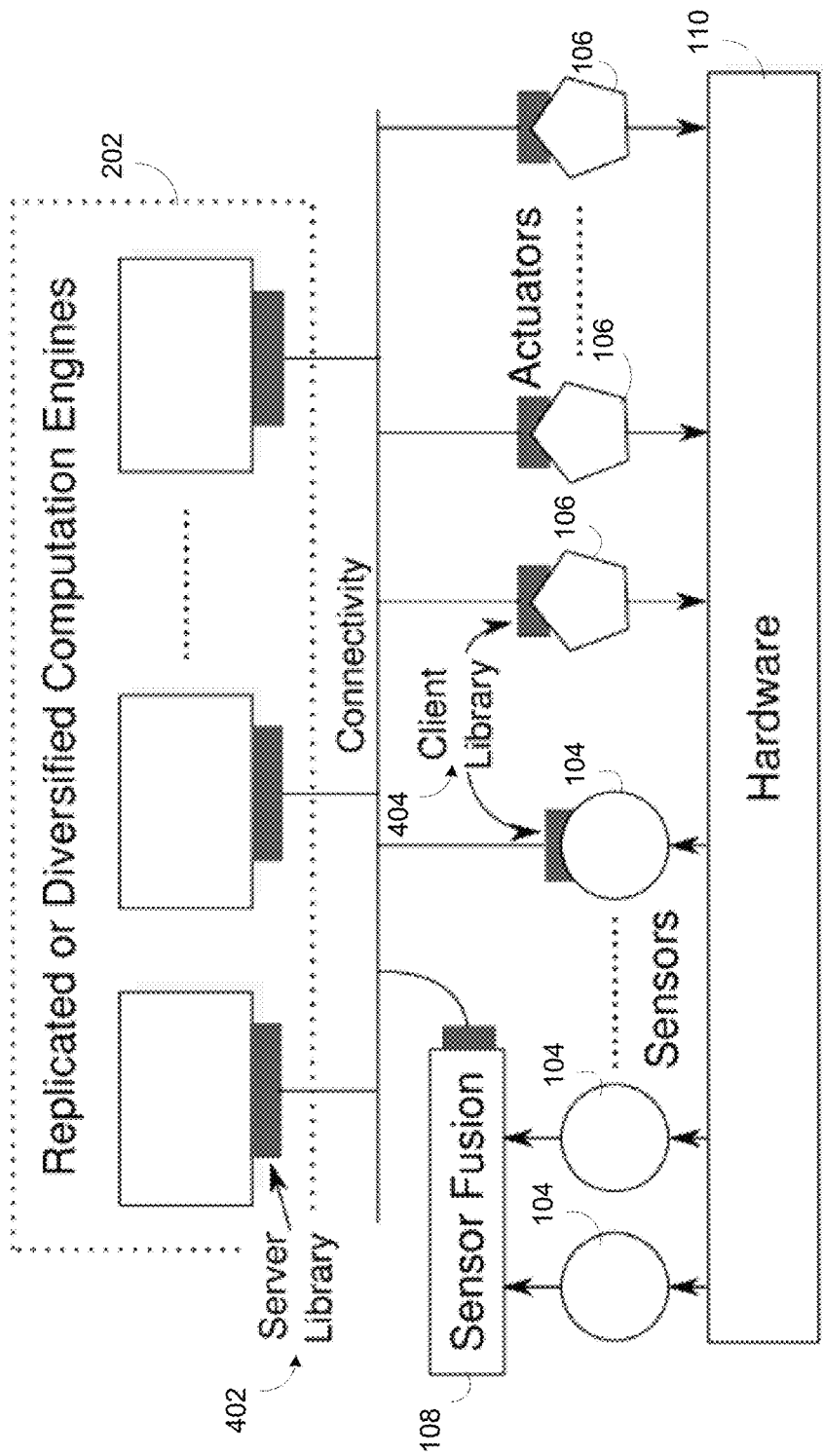
FIG. 4 is an implementation of a virtual synchrony extension of an embedded system with active monitors and arbitrators.

FIG. 4 shows an embedded system implemented with active monitors and arbitrators provided through the middleware 204 implemented through libraries 402 & 404. The shared computer resources, data, and middleware that are provided on demand through the computing network shown in FIGS. 2 and 3 are provided through libraries (referred to as a server library 402 in FIG. 4) linked to the computation engines and libraries (referred to as a client library 404 in FIG. 4) linked to the sensors 104 and actuators 106 as shown in FIG. 4. The libraries 402 & 404 provide an application program interface (API) between the respective application software executed by the replicated and diversified computation engines 202 and actuators 106 and the loosely-coupled locked-step architecture middleware services that provide a distributed execution model for the embedded systems and gives the appearance of a synchronous execution that is compliant with safety integrity levels or standards. In FIG. 4, the server APIs permit one or more computation engines 202 to join one or more groups and receive and respond to messages. Groups do not have to be defined in advance, the first computation engine instance joining a group effectively creates that group. Further, memberships can change making group membership dynamic. While a computation engine instance can, for load-sharing purposes, request details of the number of members and its sequence number within a group, the computation engine or engines need not to be aware of other instances or members in its group or groups.

On the sensors and actuators side, the client-side APIs do not belong or serve a group. The client-side APIs permit the sensors and actuators to send requests to the replicated and diversified computation engine group members with a particular ordering, and to receive back one, some, or all of the responses from the group members.

FIG. 4 further illustrates the connectivity between the various instances of the replicated or diversified computation engines 202. In a device or application where safety is a concern, this is implemented through a black communication channel. In an alternative device where safety is a concern connectivity occurs through a trusted or a shared secure electronic memory when the processes are executed on the same processor. In some implementations, the loosely-coupled locked-step architecture makes few demands on the guarantees offered by the communications channel and a data distribution service (DDS) may serve as an intermediate layer. At the physical layer, such as in a vehicle, for example, this connectivity might be provided through the CAN bus, a virtual network or bus, or an Ethernet.

To address severe failures in connectivity that might occur in the groups of replicated or diversified computation engines and those that include active monitors, a DSS or design-safe process is practiced. When failure is detected (a detection that can be made by the middleware 202 or 402 & 404), such as when a node fails or a timeout occurs, the middleware 202 or 402 & 404 shuts down only the affected hardware or computation engines to prevent output divergence.

Figure 6:
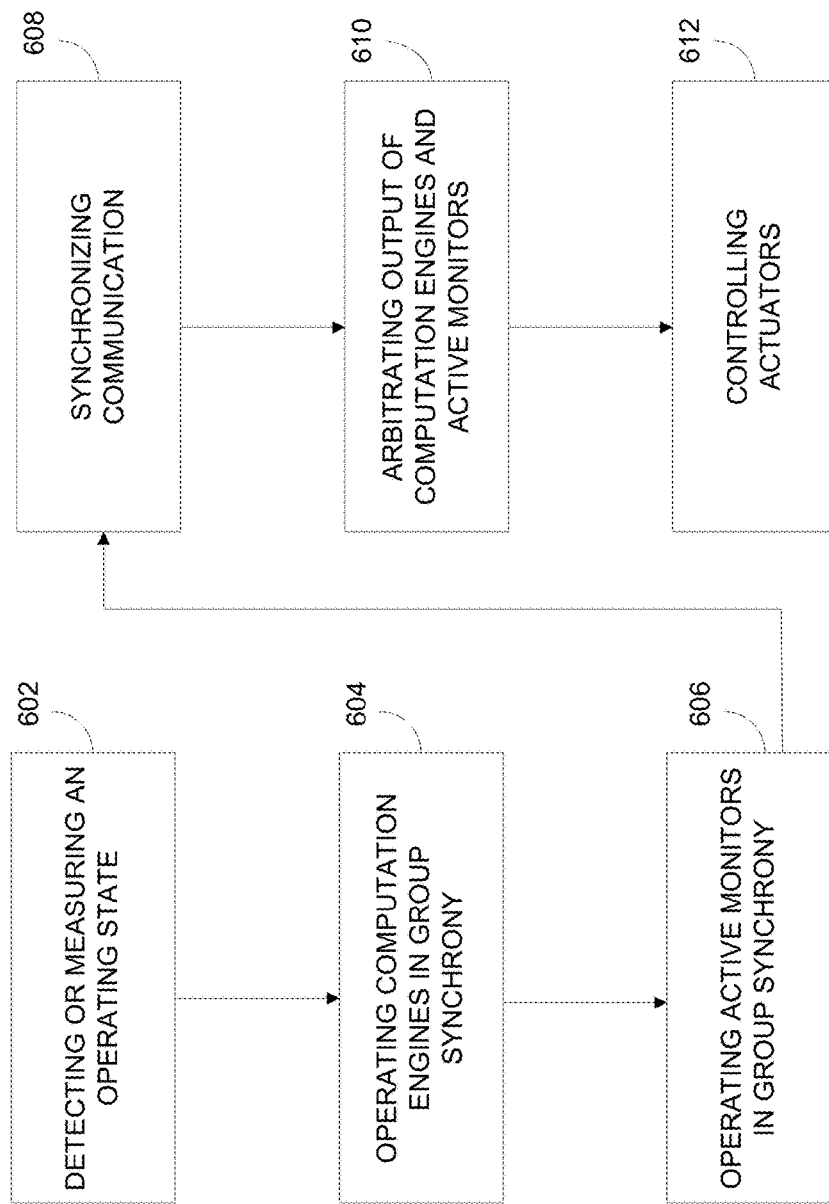
FIG. 6 is a flow diagram of a virtual synchrony extension of an embedded system with active monitors and arbitrators.

FIG. 6 is an overview of a process that detects hardware and software faults in an embedded system. The embedded system may comprise a vehicle, medical device, food or beverage dispenser or vending machine (e.g., soda machine), a control room (e.g., a nuclear power station control room) or other systems, for example, including any other system that relates to health or safety. When the embedded system is on-line and in a running state, sensors 104 detect or measure the operating state of the system it is integrated within at 602. In some instances, the sensors 104 measure or detect something by converting non-electrical energy into electrical energy. The output of the sensors 104 is transmitted to a group of replicated or diversified computation engines 202 or 308 and replicated or diversified active monitors 304 or safety bags that operate in virtual or group synchrony at 604 and 606, respectively. Virtual or group synchrony comprises a dynamic process of groups that are self-managed (computation engines and active monitors can join and leave their respective groups at will), delivers data at the same data rates as network multicasts, and communicates by piggybacking extra information on regular messages that carry updates. At 608, the loosely-coupled locked-step architecture's middleware 204 or 402 & 404 synchronizes the communication between the operating computation engine instances 202 or 308 and active monitor instances 304 and compares the reconciled limits or ranges generated by the active monitor instances 404 to the reconciled output generated by the computation engine instances 202 or 308. The middleware 204 or 402 & 404 compares the outputs and flags occurrence where the output does not fall within the predefined range. Both the outputs and associated flags are transmitted directly to the actuators 106, transmitted to an intermediate arbiter remote from the middleware 204 or 402 & 404 and actuators 106 that reconciles the differences and transmit a control signals to the actuators 106 in response to the reconciliation, or is not transmitted. When not transmitted the outputs and associated flags are reconciled by the middleware itself 204 or 402 & 404 via an internal arbiter that transmits control signals to the actuators at 612.

In some processes, the arbiter commands and actuator applies a DSS when a severe conflict, availability, or reliability issue arises. In alternative processes, the arbiter modifies or alters the output of the computational engine instances so that it is compliant with the monitoring standard generated by the active monitor instances, and in response, transmits a control signal to one or more actuators that reflects the signal's modification.

The loosely-coupled locked-step architecture's middleware 204 or 402 & 404 may comprise a processor or a portion of a program retained in a memory that serves as a bridge between the client-side sensors and actuators and the server side replicated or diversified computation engines and optional replicated or diversified active monitors. The middleware 204 or 402 & 404 provides fault-tolerance, consistency, concurrency, and reduces the complexity of programming by providing engine synchronization, casual and concurrent asynchronous messaging, message ordering, and state transfers in the embedded system. In some implementations, the middleware 204 or 402 & 404 dynamically enables members in the computational engine groups enabling one or more QM engines under certain events (such as two instances of QM when a vehicle is operating on a highway) and fewer or more QM engines under other events (such as three instances of QMs when a vehicle is operating in the city). An event generally refers to an action or occurrence detected by the middleware 204 or 402 & 404 through one or more sensors 104 or other inputs. An engine generally comprises a processor or a program or portion of a program executed by the processor that manages and manipulates data and performs one or more specific tasks.

The middleware 204 or 402 & 404 also overcomes the failings of conventional technologies that do not adapt to synchronizing embedded systems. It is difficult to know if a message reaches all computation engines with conventional technologies and if the disclosed middleware 204 or 402 & 404 is not implemented, it is not clear how to correct failures when a message is not delivered. Computation engines in a membership group do not always change instantaneously, making it is difficult to track the number of messages sent to computational engine members and the number of messages they received if the disclosed middleware 204 or 402 & 404 is not used. And should a node in a membership group fail, especially in the middle of a transmission causing some nodes to receive a message and others not, an inconsistent state may result if not detected and corrected as done by the disclosed middleware 204 or 402 & 404 creating a safety issue in the embedded system (e.g., the vehicle). A node generally refers to any computation engine coupled through a communication medium or link.

In some architectures, the elements, systems, processes, engines, algorithms and descriptions described herein may be encoded in a non-transitory storage medium, a computer-readable medium, or may comprise logic stored in a memory that may be accessible through an interface. Some signal-bearing storage medium or computer-readable medium comprise a memory that is unitary or separate (e.g., local or remote) from the vehicle. If the descriptions are performed by software, the software may reside in a memory resident to or interfaced to the one or more processors or multicore processors.

The systems and methods described are self-adaptive and extensive and evolve with the standards referenced above including ISO 26262 and IEC 61508, for example, as the standards evolve or overtime. As such, references to those standards include the current and future versions of those standards, any related standards of the current and future versions, and any superseding standards.

The memory or storage disclosed may retain an ordered listing of executable instructions for implementing the functions described above. The machine-readable medium may selectively be, but not limited to, an electronic, a magnetic, an optical, an electromagnetic, an infrared, or a semiconductor medium. A non-exhaustive list of examples of a machine-readable medium includes: a portable magnetic or optical disk, a volatile memory, such as a Random Access Memory (RAM), a Read-Only Memory (ROM), an Erasable Programmable Read-Only Memory (EPROM or Flash memory), or a database management system. When messages, actuators, computation engines, QMs, active monitors, safety bags, and/or other device functions or steps are said to be "responsive to" or occur "in response to" a function or message, the messages, actuators, computation engines, QMs, active monitors, safety bags, and/or other device functions or steps necessarily occur as a result of the message or function. It is not sufficient that a function or act merely follow or occur subsequent to another, causal ordering is necessary.

The disclosed loosely-coupled locked-step architecture for embedded systems makes use of replication and diversification through virtual synchrony. The architecture is effective in detecting and mediating hardware and software errors. When a software instance or hardware fails, for example, because of an error such as a random error, the disclosed architecture ensures that the failing system continues to operate. In some instances, the failing system may operate in a degraded state or a program defined DSS. When detected, the architecture's middleware automatically restarts the hardware or restarts all or a portion of the system's code.

The disclosed architecture separates two aspects of software design: the technical and algorithmic skill required to write or implement software that fulfills a particular purpose; and the statistical skill required to determine the level and timing of replication and diversity. The disclosed architecture allows the level of resiliency required for a particular subsystem to be programmed or actuated in response to software's own control and to be modified or actuated dynamically during the embedded system's operation in the operating environment or state of the embedded system. In a vehicle application the operating environment or state may comprise a cruising state, an urban driving state, a rural driving state, a parking state, a high or a low traffic congestion state, or any other vehicle operating state or any traffic condition state or any combination of any of the above environments or states. And, the resiliency level may establish the number of replicas activated in response to an event and their activation times or periods, the number of responses required before a response is accepted and acted upon, and the number of diverse implementations required. A vehicle may comprise, without limitation, a car, bus, truck, tractor, motorcycle, bicycle, tricycle, quadricycle, or other cycle, ship, submarine, hoverboard, boat or other watercraft, helicopter, drone, airplane or other aircraft, train, tram or other railed vehicle, spaceplane or other spacecraft, and any other type of vehicle whether currently existing or after-arising this disclosure. In other words, it comprises a device or structure for transporting persons or things.

The disclosed architecture also supports diverse computation engines and active monitors or safety bags which enables design to be partitioned dynamically and on-line with ASILs including the decomposition levels called out in the ISO 26262 standard, for example.

The underlying replication and diversification of the disclosed architecture can verify new and legacy software efficiently at the start or during the software's execution to any of the functional safety levels of a standard such as anyone of the ASIL standards described in the ISO 26262 standard without software being compliant from the start. The disclosed architecture and middleware may reduce the proofs a software program requires for certification by certification authorities and ensures operational integrity levels. Further, the disclosed architecture is not limited to vehicles as it is used in other fields, including those areas in which reliable and dependable performance is prized, such as in medical devices, for example, that may dispense drugs, assist in microscopic surgery, etc., control rooms (e.g., nuclear power station control rooms, etc.), and other fields and applications. The disclosed architecture can be used in any system or process that can be embedded in another system or process.

Other systems, methods, features and advantages will be, or will become, apparent to one with skill in the art upon examination of the figures and detailed description. It is intended that all such additional systems, methods, features and advantages be included within this description, be within the scope of the disclosure, and be protected by the following claims.

What is claimed is:

1. An embedded system, comprising:
   a plurality of sensors that detect or measure a state;
   a plurality of actuators that activate or control another mechanism;
   a plurality of replicated computation engines in communication with the plurality of sensors and the plurality of actuators that perform a specific task, wherein the plurality of replicated computation engines are replicated instances of a single computation engine and wherein the plurality of replicated computation engines are grouped into one or more groups such that, for each group, each member of the group starts in a same processing logic state and processes same events in the same order; and
   a middleware executed by a processor that actuates selected computation engines of the plurality of replicated computation engines and arbitrates between outputs of the selected computation engines, wherein the middleware intercepts the output of the plurality of sensors and transmits the output to each replicated computation engine of a group in a defined order.

2. The system of claim 1 where the arbitration executed by the middleware places an embedded system in a design safe state.

3. The system of claim 1 where the middleware is programmed to detect a hardware error and isolate the hardware error.

4. The system of claim 1 where the plurality of replicated computation engines are physically distinct and executed by different processors but appear to the plurality of actuators as a single unit.

5. The system of claim 1 where the replicated computation engines that belong to a group are synchronized.

6. The system of claim 1 where the actuators are programmed to request only a portion of a selected output generated by the plurality of replicated computation engines.

7. The system of claim 1 further comprising a plurality of active monitors in communication with the middleware.

8. The system of claim 7 where the plurality of active monitors receives the same sensor output as the plurality of replicated computation engines.

9. The system of claim 8 where the plurality of active monitors calculates the same output as the plurality of replicated computation engines but process a different combination of a sensor output.

10. The system of claim 7 where the active monitors are compliant with a safety standard such that a number of the plurality of replicated computation engines that are non-compliant with the safety standard become compliant by a monitoring executed by the plurality of active monitors.

11. The system of claim 7 where the middleware arbitrates between the output generated by the plurality of replicated computation engines and the output of the plurality of active monitors.

12. The system of claim 7 where the plurality of replicated computation engines and the plurality of active monitors operate in a virtual synchrony model, respectively.

13. An embedded system, comprising:
a plurality of sensors that detect or measure a state;
a plurality of actuators that activate or control another mechanism;
a plurality of computation engines in communication with the plurality of sensors and the plurality of actuators, the plurality of computation engines operating in group synchrony wherein the plurality of replicated computation engines are replicated instances of a single computation engine and wherein the plurality of replicated computation engines are grouped into one or more groups such that, for each group, each member of the group starts in a same processing logic state and processes same events in the same order;
a plurality of active monitors that monitor the plurality of computation engines to an automotive integrity level, the plurality of active monitors operating in group synchrony; and
a middleware executed by a processor that synchronizes the communication between the plurality of computation engines and the plurality of active monitors, respectively, wherein the middleware intercepts the output of the plurality of sensors and transmits the output to each replicated computation engine of a group in a defined order;
where the plurality of actuators arbitrates between the output generated by the plurality of computation engines operating and output generated by the plurality of active monitors.

14. The system of claim 13 where the plurality of active monitors transforms computation engines non-compliant with a safety standard into computation engines compliant with safety standard.

15. The system of claim 13 where the middleware is programmed to detect a hardware error and isolate the hardware error when the hardware error is detected.

16. A non-transitory computer readable medium storing a program that detects hardware and software errors in an embedded system of a vehicle, comprising:
computer program code that detects or measures an operating state of the vehicle;
computer program code that activates or controls another mechanism within the vehicle;
computer program code that causes a plurality of computation engines to operate in group synchrony within the vehicle, wherein the plurality of replicated computation engines are replicated instances of a single computation engine and wherein the plurality of replicated computation engines are grouped into one or more groups such that, for each group, each member of the group starts in a same processing logic state and processes same events in the same order;
computer program code that causes a plurality of active monitors that monitor the plurality of computation engines to an automotive integrity level to operate in group synchrony within the vehicle;
computer program code that synchronizes the communication between and from the plurality of computation engines and the plurality of active monitors, respectively wherein the middleware intercepts the output of the plurality of sensors and transmits the output to each replicated computation engine of a group in a defined order; and
computer program code that arbitrates between output generated by the plurality of computation engines and output generated by the plurality of active monitors.

17. The non-transitory computer readable medium of claim 16 where the plurality of computation engines comprises a plurality of computation engines non-compliant with a safety standard and further comprising means rendering the embedded system including the plurality of non-compliant computation engines compliant with safety standard without modifying the plurality of non-compliant computation engines.

18. A process that detects hardware and software failures through a loosely-coupled locked-step architecture, comprising:
detecting or measuring an operating state;
operating a plurality of computation engines in group synchrony, wherein the plurality of replicated computation engines are replicated instances of a single computation engine and wherein the plurality of replicated computation engines are grouped into one or more groups such that, for each group, each member of the group starts in a same processing logic state and processes same events in the same order;
operating a plurality of active monitors that monitor the plurality of computation engines to an integrity level to operate in group synchrony;
synchronizing the communication between and from the plurality of computation engines and the plurality of active monitors, respectively, through middleware, wherein the middleware intercepts the output of the plurality of sensors and transmits the output to each replicated computation engine of a group in a defined order; and
arbitrating between output generated by the plurality of computation engines and output generated by the plurality of active monitors.

19. The process of claim 18 further comprising actuating a mechanical device in response to the act of arbitrating.

20. A vehicle, comprising:
- a plurality of sensors that detect or measure a state of the vehicle;
- a plurality of actuators that activate or control another mechanism in the vehicle;
- a plurality of computation engines in communication with the plurality of sensors and the plurality of actuators, the plurality of computation engines operating in group synchrony wherein the plurality of replicated computation engines are replicated instances of a single computation engine and wherein the plurality of replicated computation engines are grouped into one or more groups such that, for each group, each member of the group starts in a same processing logic state and processes same events in the same order;
- a plurality of active monitors that monitor the plurality of computation engines to an automotive integrity level, the plurality of active monitors operating in group synchrony; and
- a middleware executed by a processor that synchronizes the communication between the plurality of computation engines and the plurality of active monitors, respectively, wherein the middleware intercepts the output of the plurality of sensors and transmits the output to each replicated computation engine of a group in a defined order;

where the plurality of actuators arbitrates between the output generated by the plurality of computation engines operating and output generated by the plurality of active monitors.

* * * * *